(12) United States Patent
Klacik et al.

(10) Patent No.: US 6,413,564 B1
(45) Date of Patent: Jul. 2, 2002

(54) HARD CANDY HAVING VARIABLE WIDTH SWIRL PATTERN

(75) Inventors: Kenneth J. Klacik, Hillsborough Township; Gerald Brian Cotten, Sparta; Michael S. Ferrotti, North Brunswick; Brian C. Hallacker, Stockholm, all of NJ (US); Donald Mihalich, Brooklyn, NY (US)

(73) Assignee: Nabisco, Inc., Parsippany, NJ (US)

( * ) Notice: Subject to any disclaimer, the term of this patent is extended or adjusted under 35 U.S.C. 154(b) by 0 days.

(21) Appl. No.: 09/564,767

(22) Filed: May 4, 2000

Related U.S. Application Data

(62) Division of application No. 09/317,369, filed on May 24, 1999, now Pat. No. 6,099,880.

(51) Int. Cl.$^7$ .................................................. A23P 1/12
(52) U.S. Cl. ...................... 426/249; 426/449; 426/516; 426/660
(58) Field of Search ................................. 426/449, 516, 426/660, 249

(56) References Cited

U.S. PATENT DOCUMENTS

| | | | | |
|---|---|---|---|---|
| 1,566,329 A | * | 12/1925 | Laskey | |
| 1,628,251 A | * | 5/1927 | Laskey | |
| 1,839,719 A | * | 1/1932 | Walter | |
| 2,847,947 A | * | 8/1958 | Pelletier | |
| 2,874,649 A | * | 2/1959 | Pelletier | |
| 2,893,605 A | * | 7/1959 | Anderson | |
| 3,014,437 A | * | 12/1961 | Dutchess | |
| 3,128,724 A | * | 4/1964 | Linder | |
| 3,265,510 A | * | 8/1966 | Wurzburg et al. | |
| 3,295,467 A | * | 1/1967 | Gropen | |
| 3,486,469 A | * | 12/1969 | Recas | |
| 3,689,280 A | * | 9/1972 | Werner | |
| 3,806,617 A | * | 4/1974 | Smylie et al. | |
| 3,876,743 A | * | 4/1975 | Soderlund et al. | |
| 3,991,217 A | * | 11/1976 | Kinney | |
| 4,873,104 A | * | 10/1989 | Butcher | |
| 4,925,380 A | * | 5/1990 | Meisner | |
| 6,039,554 A | * | 3/2000 | Akutagawa | |
| 6,200,125 B1 | * | 3/2001 | Akutagawa | |
| 2001/0001675 A1 | * | 5/2001 | Akutagawa | |

FOREIGN PATENT DOCUMENTS

| | | | |
|---|---|---|---|
| FR | 847554 | * | 10/1939 |
| JP | 11-346658 | * | 12/1999 |
| WO | WO98/53699 | * | 12/1998 |

OTHER PUBLICATIONS

Hutt FORMPRESS Installations brochure, pp. 1–4, 15–22.*
Chenoweth, "How to Make Candy", pp. 168, 170, 1936.*
Clyne, "A Course in Confectionery", pp. 83–88, 93–96, 1955.*
Roth, "Old–Fashioned Candymaking", pp. 84–85, 1974.*
Morgan, "Chocolate and Candy Cookbook", pp. 116, 117, 168, 169, 1979.*
"Candy", Time–Life Books, pp. 92–93, 1981.*

* cited by examiner

*Primary Examiner*—N. Bhat
(74) *Attorney, Agent, or Firm*—Scully, Scott, Murphy & Presser

(57) ABSTRACT

Hard candy exhibiting a plurality of segments having differing colors and varying widths is produced by depositing a plurality of supersaturated solutions of ingredients of differing colors into a mold through a nozzle which has openings around its periphery wherein the openings have different widths.

5 Claims, 2 Drawing Sheets

HARD CANDY HAVING VARIABLE WIDTH SWIRL PATTERN

This application is a division of Ser. No. 09/317,369 filed May 24, 1999 now U.S. Pat. No. 6,099,880.

FIELD OF THE INVENTION

The present invention relates to hard candy wherein sectors of two or more colors are arranged in a pattern radiating outwards from a midpoint on each surface of the candy.

BACKGROUND OF THE INVENTION

Hard candies, that is, solid individual pieces which fit comfortably into the mouth, are of course well known. It is also known in general to make hard candies which are of a single uniform color, or which exhibit two or more colors.

Hard candies are traditionally considered to consist of supercooled, supersaturated sugar or sugar alcohol solutions and to exhibit the characteristics of amorphous solids. The moisture content of such traditional hard candies is generally in the range of from ½–3½% Dairy-based hard candies may also include various ingredients such as cream, butter and milk, which contribute to properties such as mouth feel and flavor. Fat based hard candies, sometimes known as toffee, may contain vegetable, dairy or animal fats to provide a rich food mouth feel. If a suitable gelling or aerating agent is added to hard candy, and the moisture content is raised to the range of 6–9%, a so-called "chew" results. As used herein, the term "hard candy" refers to all of the foregoing food products.

Hard candies which are comprised of two or more regions of differing colors can be made by any of various depositing technologies. Such technologies often have involved complex machinery and processing conditions.

It has become desirable in the field of hard candies to be able to produce a product which exhibits a plurality of segments of differing colors, wherein the segments are not all identical to each other but exhibit a variety of widths. By "segment" is meant herein a region of one color which is generally triangular in shape, extending from a point on the surface of the hard candy and gradually increasing in width as it extends toward the outer edge of the candy piece, in which the color extends through the piece to the other surface. It would be desirable to be able to form a candy piece wherein the widths of various of the segments at the outer edge of the candy differ one from another, and especially wherein the widths of adjacent segments at the outer edge differ. Hard candy having such an appearance is believed to provide an interesting and visually pleasing appearance to the customer and consumer.

BRIEF SUMMARY OF THE INVENTION

The present invention satisfies these objectives, and provides the other advantages described herein.

In one aspect, the invention is a hard candy with top and bottom surfaces and a circumferential outer edge at which the top and bottom surfaces meet, wherein both said top and bottom surfaces comprise a plurality of segments of at least two different colors, wherein each segment begins at a common midpoint on said surface and grows progressively in width from said midpoint to said outer edge and extends through said piece to the other surface, and wherein there are segments having at least two different widths at said outer edge, wherein said segments extend axially through said candy from the top surface to the bottom surface. The piece of candy can be in the shape of a disc or can have any other desired shape such as a heart.

Another aspect of the present invention is the method of producing such a hard candy, by providing a plurality of flowable supersaturated solutions of candy ingredients equal in number to the desired number of colors, and depositing said solutions into a mold through a nozzle having around its periphery openings equal in number to the desired number of segments, wherein said openings vary in width, wherein adjacent openings receive supersaturated solutions of differing colors, and allowing the product in said mold to solidify.

DETAILED DESCRIPTION OF THE INVENTION

Figure 1:
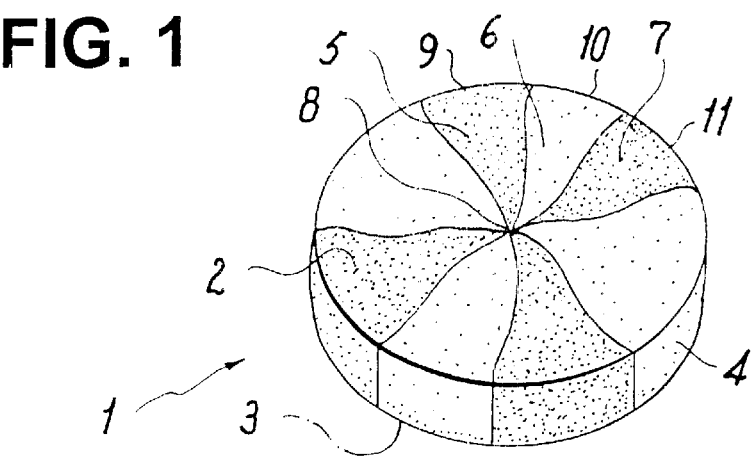
FIG. 1 is a view of a piece of hard candy according to the invention.

Referring first to FIG. 1, a piece 1 of hard candy has top surface 2, bottom surface 3 (not seen), and peripheral edge 4. The piece is preferably circular, but it can have another shape such as elliptical, square, rectangular, heart-shaped, and so forth.

The piece contains a plurality of segments, of which consecutively adjacent segments 5, 6 and 7 are labeled in FIG. 1. Each segment extends from midpoint 8 in a generally triangular shape out to peripheral edge 4. Midpoint 8 can be in the geometric center of piece 1, but it can instead be located elsewhere on the top surface 2. Midpoint 8 should be spaced inward from peripheral edge 4 a sufficient distance that the segment or segments which extend the shortest distance from an "off-center" midpoint to the closest peripheral edge still have some color. The boundaries between adjacent segments can be generally straight (recognizing that in modern high-speed depositing technologies, perfectly straight lines are difficult to obtain), but the boundaries can instead be curved, as in a gentle arc, or can swirl, as in a general S-shape.

As can be seen in FIG. 1, the outermost edges 9, 10 and 11 of segments 5, 6 and 7 have widths which differ one from the other. Especially, the widths of adjacent segments differ. This pattern of varying widths around the peripheral edge 4 can be seen all the way around the piece of candy. It can also be seen that the segments extend axially through the piece from the top surface to the bottom surface.

The number of segments must be at least 2, is preferably 6 to 14, and is more preferably 10–14 and even more preferably 12. There are preferably 2 colors, arranged in alternating segments, but 3 or more colors can also be used. The segments should exhibit at least 2 different widths, preferably at least 3, and more preferably at least 4. The widths preferably fall in the range of 0.05 inch to 0.15 inch. Preferably, each segment has a unique width, although of course segment widths can be whatever the designer chooses.

The candy itself is made of conventional ingredients. The production involves preparation of flowable masses of differing colors, each being an aqueous supersaturated solution of the candy ingredients, and depositing the solutions through the nozzle into a mold where the final unit product is then allowed to solidify by cooling. The primary ingredient in the product is sweetener, which can be for example any of sucrose, sugar alcohols, fructose, corn syrup, invert sugar, intensive natural or synthetic sweeteners, and combinations thereof. Optional ingredients include fats and/or vegetable oils, such as milk fat and coconut oil, for texture and mouth feel. Representative of a typical composition of the flowable mass is an aqueous supersaturated solution of about 45 to about 70% by weight sucrose, about 30 to about 55% by weight corn syrup solids, and 0 to about 3% by weight flavoring and/or coloring agent.

There should be provided as many separate flowable compositions as there are colors in the desired final product. Thus, each flowable composition has a color, either by containing a coloring agent or by being of the color imparted by the particular combination of ingredients of which it is composed. There are numerous examples of food-grade coloring agents suitable for use in this invention to provide any desired color. In practice, it is preferred to employ approximately equal amounts of each material of each color, for reasons of production efficiency and economics. However, it may also be desirable to use other ratios of materials.

Each flowable composition is fed into hoppers, in preparation for being deposited by the depositor into molds. The depositor should be of essentially conventional design, except as described herein, such that each separate flowable composition is fed through the nozzle without being mixed with other flowable compositions of other colors. The depositor should include a special nozzle such as the one shown in FIG. 2, recognizing that many other designs can be employed instead as long as the basic principles described herein are observed.

Figure 2A:
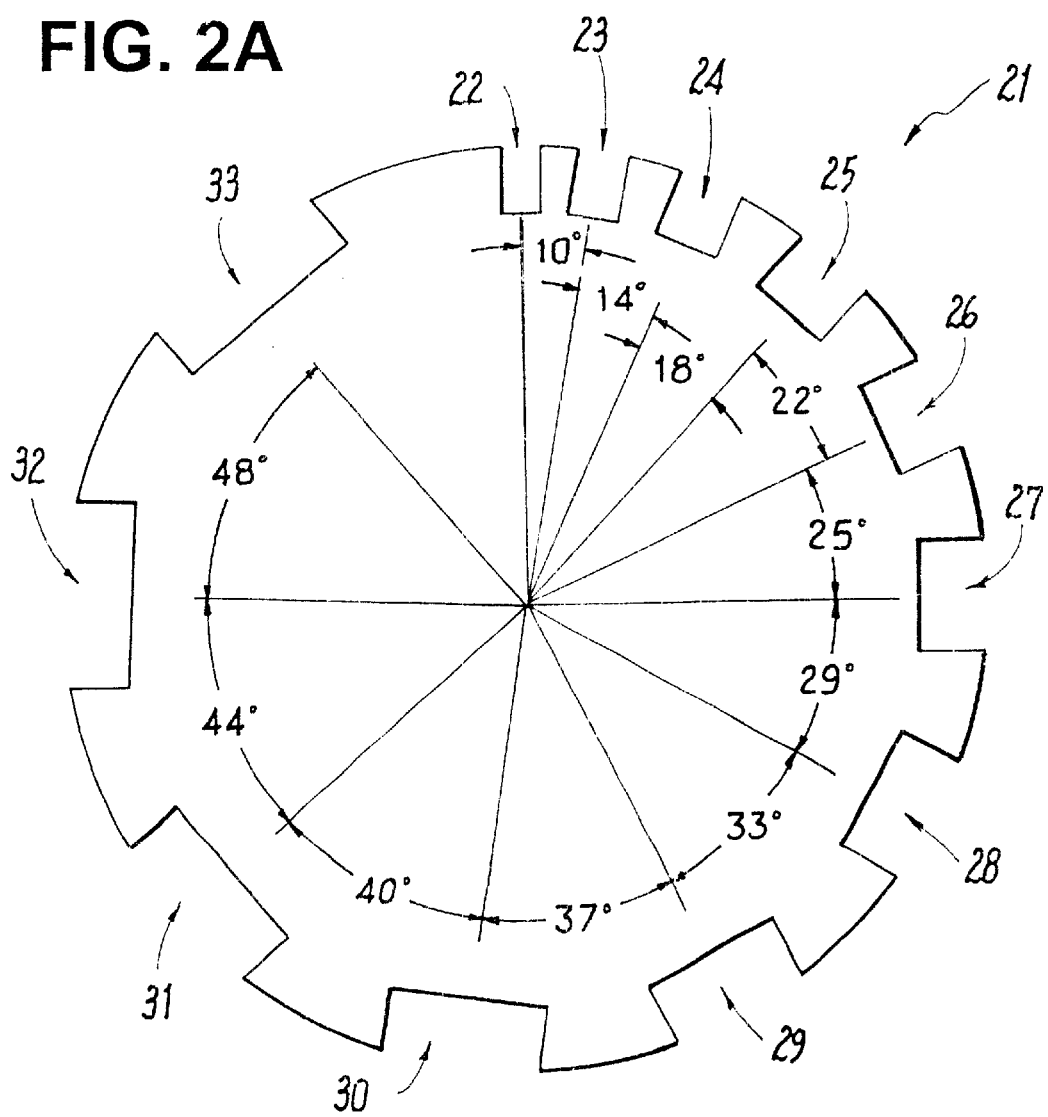
FIG. 2A is a view of a nozzle plate used in the production of hard candy according to a first embodiment of the invention wherein the periphery openings are progressively wider.
Figure 2B:
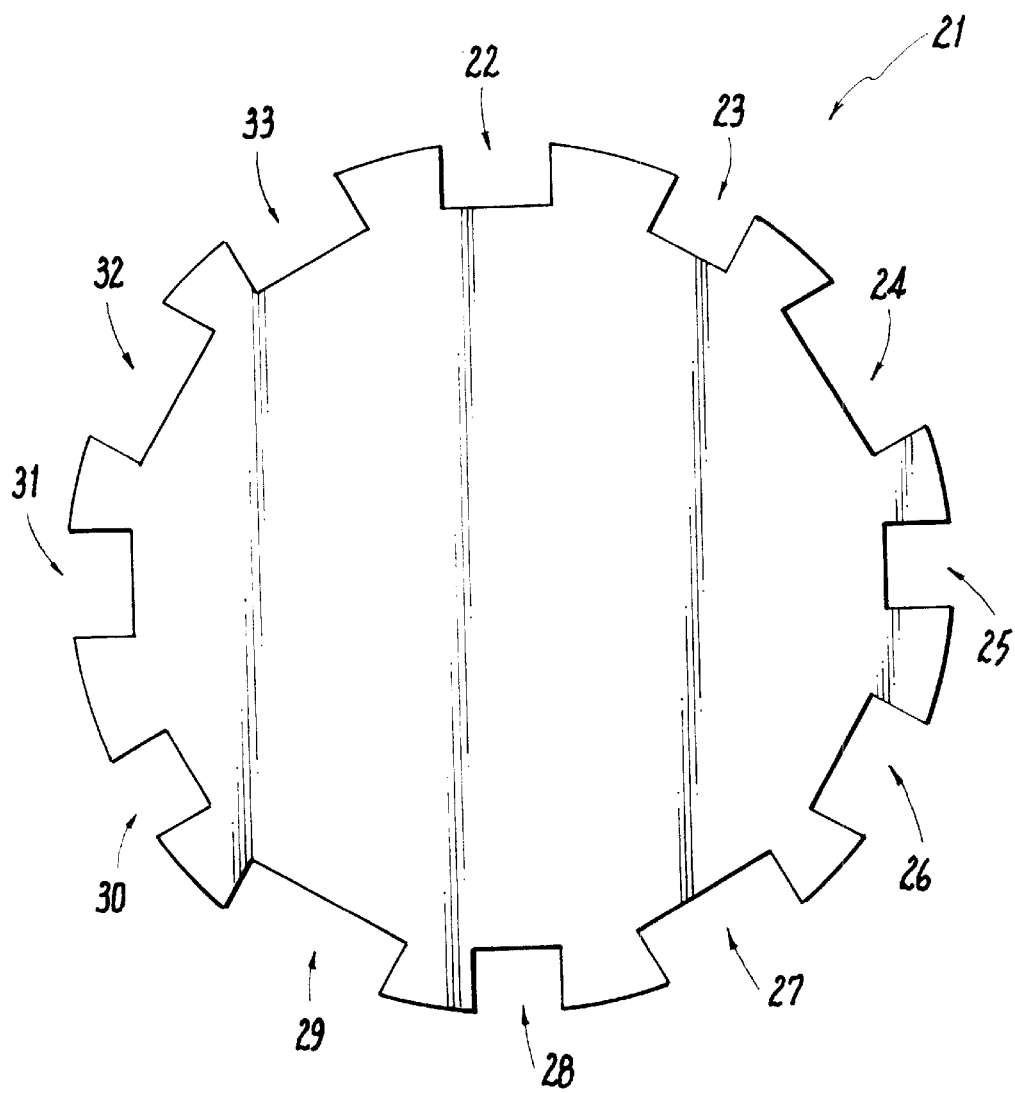
FIG. 2B is a view of a nozzle plate used in the production of hard candy according to a second embodiment of the invention wherein the periphery openings are of intermittent width.

Referring to FIG. 2A, there is seen a nozzle 21 which is dimensioned to fit into the orifice of the depositor being used. Plate 21 contains a number of openings 22–33 around its periphery. As illustrated in FIG. 2A, the openings 22–33 are progressively wider. As illustrated in FIG. 2B, the openings are of intermittent size about the periphery. Other configurations are within the contemplation of the invention, In practice, there should be as many openings as there are to be segments in the desired deposited piece of candy. The openings have a variety of widths. Preferably, no pair of adjacent openings has the same width. Each opening should be in the range of 0.05 to 0.15 inch wide. The openings are arranged so that the deposited product presents segments having a variety of widths.

In operation, the flowable compositions are pumped through the nozzle shown in FIGS. 2A, 2B, in otherwise conventional manner such that each individual piece is deposited into a mold where the pieces are allowed to cool to form the final hard candy pieces.

What is claimed is:

1. A comestible comprising a hard candy having top and bottom surfaces and a circumferential outer edge at which said top and bottom surfaces meet wherein
   (a) said hard candy comprises a plurality of segments which grow progressively in width from a common midpoint to said outer edge;
   (b) said segments have at least two different widths at said outer edge;
   (c) said segments extend axially from said top surface to said bottom surface; and
   (d) said segments are separated from each other by curved boundaries.

2. A comestible in accordance with claim 1 comprising 6 to 14 segments.

3. A comestible in accordance with claim 1 wherein each of said segments is of a unique width.

4. A comestible in accordance with claim 1 wherein said curved boundaries between said segments are arcs.

5. A comestible in accordance with claim 1 wherein said curved boundaries between said segments are S-shaped.

* * * * *